United States Patent
Kim et al.

(10) Patent No.: US 10,843,075 B2
(45) Date of Patent: Nov. 24, 2020

(54) COMPUTING DEVICE FOR PROVIDING REPLAY

(71) Applicant: Kakao Games Corp., Gyeonggi-do (KR)

(72) Inventors: Wooyong Kim, Seoul (KR); Suhyoung Kim, Gyeonggi-do (KR)

(73) Assignee: KAKAO GAMES CORP., Gyeonggi-Do (KR)

( * ) Notice: Subject to any disclaimer, the term of this patent is extended or adjusted under 35 U.S.C. 154(b) by 0 days.

(21) Appl. No.: 16/515,604

(22) Filed: Jul. 18, 2019

(65) Prior Publication Data

US 2020/0122035 A1    Apr. 23, 2020

(30) Foreign Application Priority Data

Oct. 19, 2018 (KR) .................. 10-2018-0125370

(51) Int. Cl.
*A63F 13/49* (2014.01)
*A63F 13/493* (2014.01)
*A63F 13/67* (2014.01)

(52) U.S. Cl.
CPC ............ *A63F 13/493* (2014.09); *A63F 13/67* (2014.09)

(58) Field of Classification Search
CPC ........ A63F 13/49; A63F 13/497; A63F 13/50; A63F 13/52; A63F 13/537; A63F 13/67; A63F 13/70
See application file for complete search history.

(56) References Cited

U.S. PATENT DOCUMENTS

2012/0190505 A1* 7/2012 Shavit ............... A63B 71/0622
                                                          482/8
2014/0364206 A1* 12/2014 Shiraiwa ............... A63F 13/497
                                                          463/31
(Continued)

FOREIGN PATENT DOCUMENTS

KR            101629378 B1    6/2016
KR         1020160137924 A   12/2016
(Continued)

OTHER PUBLICATIONS

HERO4EARTH, League of Legends Game Loss Prediction, Jan. 28, 2018, accessed at hero4earth.com/blog/projects/2018/01/28/LoL_winner_prediction/.

(Continued)

*Primary Examiner* — Omkar A Deodhar
(74) *Attorney, Agent, or Firm* — Umberg Zipser LLP

(57) ABSTRACT

Disclosed is a non-transitory computer readable medium storing a computer program, in which when the computer program is executed by one or more processors of a computing device. The computer program allows the one or more processors to the following operations and the operations may include an operation of computing an evaluation score for each of one or more game data subsets by using the one or more game data subsets included in the game data as input of an operation evaluation model; an operation of identifying a singularity where the amount of change of the evaluation score exceeds a predetermined threshold change amount; and an operation of extracting a main game data set from the game data set based on the singularity.

8 Claims, 6 Drawing Sheets

(56) References Cited

U.S. PATENT DOCUMENTS

| | | | |
|---|---|---|---|
| 2015/0224409 A1* | 8/2015 | Hayashida | A63F 13/497 463/31 |
| 2015/0348591 A1 | 12/2015 | Kaps et al. | |
| 2017/0157512 A1* | 6/2017 | Long | A63F 13/86 |
| 2017/0266560 A1 | 9/2017 | Harris et al. | |

FOREIGN PATENT DOCUMENTS

| KR | 1020170078327 A | 7/2017 |
|---|---|---|
| KR | 1020180026745 A | 3/2018 |

OTHER PUBLICATIONS

Korea Patent Office, Office Action, dated Oct. 8, 2019.

* cited by examiner

COMPUTING DEVICE FOR PROVIDING REPLAY

CROSS-REFERENCE TO RELATED APPLICATIONS

This application claims priority to and the benefit of Korean Patent Application No. 10-2018-0125370 filed in the Korean Intellectual Property Office on Oct. 19, 2018, the entire contents of which are incorporated herein by reference.

TECHNICAL FIELD

The present disclosure relates to a computing device for providing a game image, and more particularly, to a computing device for providing an image for a game play.

BACKGROUND ART

As games become more popular today, the ages of enjoying games have also changed. Specifically, in the past, if the game was played mainly by the youth, the middle-aged people in their thirties or forties or 50 or more now enjoy the game through a smartphone or a PC. With the development of one-person media (for example, personal broadcasting) in conjunction therewith, services specialized to moving pictures, such as YouTube and Naver TV cast are emerging as mainstream contents. Accordingly, people of various ages increase who observes a game image of another user without personally playing a game, for example, observes an image of a professional gamer in order to get vicarious satisfaction or enhance a game skill of a user himself/herself while viewing a highlight scene for a game play of another user.

However, it may be difficult to produce a replay image that is viewed by a large number of people and to edit the produced image. Specifically, when the game image is recorded on the smartphone, there is a fear that an image quality is lowered and the game is interrupted during the game play and in the case of recording on the PC, the user may have troubles such as pressing a start/end button personally and a capacity of the recorded game image may be relatively large. In addition, a process from shooting to editing requires a considerable amount of time, and learning an image program for editing may require time and money.

Therefore, in the related art, there is a demand for a replay image providing computing device which can prevent a concern about additional hassle, capacity shortage, low image quality and interruption in replay image production, and automatically edit a specific section such as a main scene in the replay image.

SUMMARY OF THE INVENTION

The present disclosure has been made in an effort to provide a computing device for providing a replay image for a game play of a user.

An exemplary embodiment of the present disclosure provides a non-transitory computer readable medium storing computer program which is executable by one or more processors. The computer program may allow the one or more processors to the following operations and the operations may include may include an operation of computing an evaluation score for each of one or more game data subsets by using the one or more game data subsets included in the game data as input of an operation evaluation model; an operation of identifying a singularity where the amount of change of the evaluation score exceeds a predetermined threshold change amount; and an operation of extracting a main game data set from the game data set based on the singularity.

Alternatively, each of the one or more game data subsets may include one or more game data grouped based on a predetermined criterion.

Alternatively, the operation evaluation model may include an optimum operation determination submodel that is learned to determine an optimum operation corresponding to the game data subset with the game data subset as an input and an evaluation score determination submodel learned to output the evaluation score based on a similarity comparison of the optimum operation determined through the optimum operation determination submodel and an operation included in the game data subset.

Alternatively, the operation of extracting the main game data set from the game data set based on the singularity may include an operation of identifying a plurality of game data subsets within a predetermined range based on the singularity among the game data sets and an operation of generating a main game data set including the plurality of identified game data subsets.

Alternatively, the operation may further include an operation of generating a replay image based on the main game data set and the replay image may include one or more special effects that enable a client to identify a main situation of the game.

Alternatively, the operation may further include an operation of generating play feedback information based on the main game data set and the play feedback information as information for causing a high evaluation score to be output in the evaluation score determination submodel may mean information that allows the play of the user to be improved.

Alternatively, the play feedback information may be generated by changing one or more game data included in a specific game data subset that calculates the low evaluation score among one or more game data subsets.

Alternatively, the operation may further include an operation of generating game addition information based on the main game data set and the game addition information as information on a further description related to the play of the user may include at least one of information on a game situation, information of the operation of the user, and information on a game progress time.

Alternatively, the operation may further include a means for calculating an overall evaluation score based on an evaluation score for each of one or more game data subsets for each of a plurality of users and a means for generating winning rate prediction information among the plurality of users by comparing respective overall evaluations calculated for each of the plurality of users.

Another exemplary embodiment of the present disclosure provides a method for providing a replay image. The method may computing an evaluation score for each of one or more game data subsets by using the one or more game data subsets included in the game data as input of an operation evaluation model; identifying a singularity where the amount of change of the evaluation score exceeds a predetermined threshold change amount; and extracting a main game data set from the game data set based on the singularity.

Still another exemplary embodiment of the present disclosure provides a server which may include: a server processor including one or more cores; a server memory storing program codes executable on the processor; and a server network unit transmitting/receiving data with a client device and the processor may be configured to: compute an evaluation score for each of one or more game data subsets by using the one or more game data subsets included in the game data as input of an operation evaluation model; identify a singularity where the amount of change of the evaluation score exceeds a predetermined threshold change amount; and extract a main game data set from the game data set based on the singularity.

According to an exemplary embodiment of the present disclosure, a computing device for providing a replay image for a game play for a user can be provided.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

DETAILED DESCRIPTION

Figure 1:
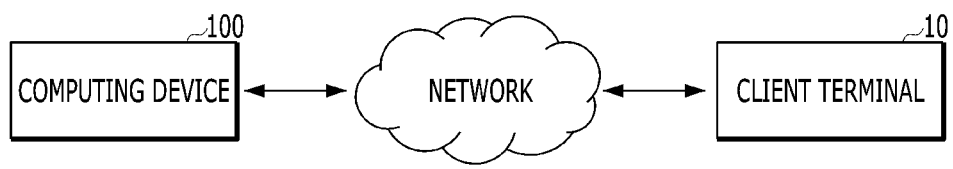
FIG. 1 is a conceptual diagram illustrating a system for providing a replay image according to an exemplary embodiment of the present disclosure.

Various exemplary embodiments will now be described with reference to drawings. In the present specification, various descriptions are presented to provide appreciation of the present disclosure. However, it is apparent that the embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, or the case where X uses both A and B. Further, it should be understood that the term "and/or" used in the specification designates and includes all available combinations of one or more items among enumerated related items.

It should be appreciated that the term "comprise" and/or "comprising" means that presence of corresponding features and/or components. However, it should be appreciated that the term "comprises" and/or "comprising" means that presence or addition of one or more other features, components, and/or a group thereof is not excluded. Further, when not separately specified or not clear in terms of the context that a singular form is indicated, it should be construed that the singular form generally means "one or more" in the present specification and the claims.

Those skilled in the art need to recognize that various illustrative logical blocks, configurations, modules, circuits, means, logic, and algorithm steps described in connection with the exemplary embodiments disclosed herein may be implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

FIG. 1 is a conceptual diagram illustrating a system for providing a replay image according to an exemplary embodiment of the present disclosure.

In the present disclosure, a computing device 100 communicates with a client terminal 10 to exchange information. Further, the computing device 100 may store predetermined information/data in a database or a computer readable medium. The computer readable media may include computer readable storage media and computer readable communication media. The computer readable storage media may include all kinds of storage media storing programs and data so as to be readable by a computer system. According to an aspect of the present disclosure, the computer readable storage media may include a read only memory (ROM), a random access memory (RAM), a compact disk (CD)-ROM, a digital video disk (DVD)-ROM, a magnetic tape, a floppy disk, an optical data storage device, and the like. Further, the computer readable communication media may include a medium which is implemented in a type of a carrier wave (e.g., transmissions through the Internet). Additionally, the media are distributed to systems connected through network to store computer readable codes and/or commands in a distribution scheme. A configuration of the computing device 100 of the present disclosure will be described below in detail in FIG. 2 below.

According to an exemplary embodiment of the present disclosure, the computing device 100 may provide to a plurality of client terminals 10 a replay image including a play image of at least one user of a plurality of users. In this case, the replay image provided by the computing device 100 to the client terminal 10 may be generated based on a game data set played by the plurality of users. More specifically, the computing device 100 may receive the game data set of each of the plurality of users from a game server or the client terminal 10. In addition, the computing device 100 may extract main game data based on a time when a main inflection point occurs in the game data set and generate the replay image based on the extracted main game data. That is, the computing device 100 may edit an image of a user who performs a specific play among a plurality of users who play the game on the game server and provide the edited image to the client terminal 10. In this case, the specific play may be a main play which leads the user to victory or defeat of the game. Accordingly, the computing device 100 may provide the replay image to the plurality of users even if each of the plurality of users does not separately record the play thereof and automatically edit and provide the replay image to include only the main play of the user, thereby providing convenience to the plurality of users. In addition, since the replay image generated by the computing device 100 is generated based on the game data sets performed by the plurality of users, the replay image may be generated without performing recording separately by each of the plurality of users.

The replay image generated by the computing device 100 may include one or more special effects so that the client may identify a game main situation. In this case, one or more special effects may include at least one of a color reversal effect, an enlargement effect, a slow effect, a highlight effect, a polygonal division effect, and a repetitive effect. Accordingly, the client viewing the replay image may more clearly grasp the main situation based on high visibility, which may cause a greater interest in viewing the replay image.

According to an exemplary embodiment of the present disclosure, the computing device 100 may generate play feedback information corresponding to the replay image. In this case, the play feedback information is information for improving the play of the user, and may include negative evaluation, positive evaluation, and predictive evaluation of the play of the user, and may be provided to the client terminal 10 as at least one form of a subtitle form, a guide form, and a voice form. In addition, the computing device 100 may synchronize the play feedback information to correspond to the replay image. That is, the client may receive the replay image of the game played by the user and various information for winning the game in the respective situations included in the replay image, so that a best operation that may be performed in various situations in the game may be learned through viewing.

Figure 2:
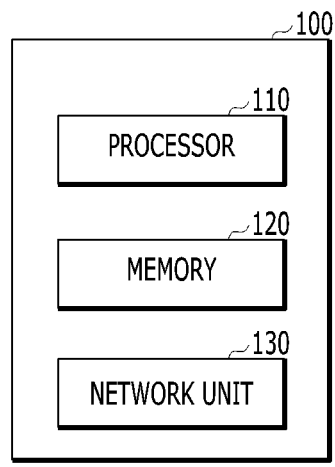
FIG. 2 is a block diagram of a computing device for providing a replay image according to an exemplary embodiment of the present disclosure.

FIG. 2 is a block diagram of a computing device for providing a replay image according to an exemplary embodiment of the present disclosure.

Components of the computing device 100 illustrated in FIG. 2 are exemplary. Only some of the components illustrated in FIG. 2 may constitute the computing device 100. Further, an additional component(s) may be included in the computing device 100 in addition to the components illustrated in FIG. 2.

As illustrated in FIG. 2, the computing device 100 may include a processor 110, a memory 120, and a network unit 130. The computing device 100 according to the present disclosure may include, for example, a game server in which game data are collected and may be connected to the game server to exchange data.

According to an exemplary embodiment of the present disclosure, the processor 110 may receive the game data set for each of the plurality of users from the game server. Each game data set may include game data for each user. In this case, the game data set received by the processor 110 may include one or more game data subsets. In addition, each of the one or more game data subsets may be constituted by one or more game data grouped based on a predetermined criterion. In this case, the game data may be at least one of a scripter and log data that may represent a game state change as data on a game activity of the user who played the game on the game server. For example, when the predetermined criterion corresponds to a time for 5 minutes, each of the one or more game data subsets may be constituted by one or more game data stored through the game play of the user for 5 minutes. In other words, the processor 110 may receive one or more game data generated on the game server by performing an online game by the user. That is, the processor 110 may acquire detailed information on the game situation played by the user through the plurality of game data received through the game server. The concrete description of the predetermined criterion for grouping the game data is just an example and the present disclosure is not limited thereto.

According to an exemplary embodiment of the present disclosure, the processor 110 may output an evaluation score for each of one or more game data subsets by using one or more game data subsets included in the game data set as an input of an operation evaluation model. In this case, the operation evaluation model may be constituted by an optimum operation determination submodel and an evaluation score determination submodel. The operation evaluation model may recognize a situation at any timing in the game and calculate an optimum operation in the corresponding situation and determine an influence which an operation performed in the corresponding situation by the player exerts on the game.

The operation evaluation model may be constituted by an artificial neural network, which may be constituted by a set of interconnected computational units that may be generally referred to as a "node". The "nodes" may also be called "neurons". The neural network is configured to include one or more nodes. The nodes (alternatively, neurons) constituting the neural network may be connected to each other by one or more "links".

In the neural network, one or more nodes connected through the link may relatively form the relationship between an input node and an output node. Concepts of the input node and the output node are relative and a predetermined node which is in the output node relationship with respect to one node may have the input node relationship in the relationship with another node and vice versa. As described above, the relationship of the output node to the input node may be generated based on the link. One or more output nodes may be connected to one input node through the link and vice versa.

In the relationship of the input node and the output node connected through one link, a value of the output node may be determined based on data input in the input node. Here, a node connecting the input node and the output node to each other may have a weight. The weight may be variable and the weight may be updated by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationships in the neural network. A characteristic of the neural network may be determined according to the number of nodes, the number of links, correlations between the nodes and the links, and values of the weights granted to the respective links in the neural network. For example, when the same number of nodes and links exist and two neural networks in which the weight values of the links are different from each other exist, it may be recognized that two neural networks are different from each other.

According to an exemplary embodiment of the present disclosure, the optimum operation determination submodel may be learned to determine an optimum operation (i.e., an operation that may yield a best result) among operations that the user may play in a specific situation in the game. More specifically, the optimum operation determination submodel may recognize the situation in the game by reading the game data subset as an input thereof and output the score to each of at least one candidate operation. That is, the optimum operation determination submodel may determine an operation appropriate to the situation of the corresponding game data subset through a policy of the optimum operation determination submodel by inputting the game data subset. The policy of the optimum operation determination submodel may be modified based on the evaluation of the determined operation. The optimum operation determination submodel may determine operation information based on the score for each of the candidate operations. Specifically, the optimum operation determination submodel may output the score to each of the plurality of operations corresponding thereto based on the game data subset and determine an operation in which the score becomes the maximum among the plurality of operations. For example, when the score for each of the plurality of operations output based on the game data subset is 15, 28, 31, 2, and 5, the optimum operation determination submodel may determine the operation by selecting 31 which is a highest score among the plurality of operations. The concrete description of a score value for the optimum operation determination submodel is just an example and the present disclosure is not limited thereto. In other words, the optimum operation determination submodel may have a plurality of operation options according to the situation of the user in the game and a most appropriate operation may be determined among a plurality of operation options by using a computation of the artificial neural network. The optimum operation determination submodel may determine whether the operation is appropriate for achieving a target based on the evaluation of the determined operation and modify a policy for determining the operation so that a probability of selecting the operation in the situation where the operation is determined will increase or decrease based on the evaluation. For example, when the operation determined in the optimum operation determination submodel is inappropriate for achieving the target (e.g., an operation of moving into an ultimate shootout range of an opponent character), the optimum operation determination submodel may be learned so as to decrease a probability of selecting the corresponding operation in the same or similar situation in which the determination is made by the game data subset. Further, for example, when the operation determined in the optimum operation determination submodel is appropriate for achieving the target (e.g., an operation of avoiding the ultimate skill shootout range of the opponent character in a situation in which the opponent character takes a motion to use the ultimate skill), the optimum operation determination submodel may be learned so as to increase a probability of selecting the corresponding operation in the same or similar situation in which the determination is made by the game data subset. The operations determined in the game data and the optimum operation determination submodel are just examples and the present disclosure is not limited thereto.

The optimum operation determination submodel may be learned by a reinforcement learning method which makes an optimal determination about a future operation to be performed through a process of performing the operation and receiving feedback on a reward.

According to an exemplary embodiment of the present disclosure, the evaluation score determination submodel may calculate the evaluation score for the operation played by the user in a specific situation in the game. More specifically, the evaluation score determination submodel can output the evaluation score based on the comparison of the similarity of the operations included in the game data subset and the optimum operation determined through the optimal operation determination submodel. The evaluation score determination submodel may be learned so that the artificial neural network outputs a low evaluation score when a similarity of the optimum operation and the operation included in the game data subset is low or learned so that the artificial neural network outputs a high evaluation score when the similarity of the optimum operation and the operation included in the game data subset is high. In this case, a method for determining the similarity by the operation evaluation model may be, specifically, at least one method of a time series similarity determination method for measuring the similarity with time, a method for determining the similarity through comparison of ratios of specific operations included in the game data subset, and a graph similarity measurement method for determining the similarity by converting the optimum operation into a coordinate of a graph and calculating a coordinate distance between the optimum operation converted into the coordinate of the graph and the specific operation included in the game data subset converted into the coordinate of the graph. The description of the method for determining the similarity is just an example and the present disclosure may include an arbitrary similarity measurement method that may compare and determine the similarities of the respective data.

Figure 4:
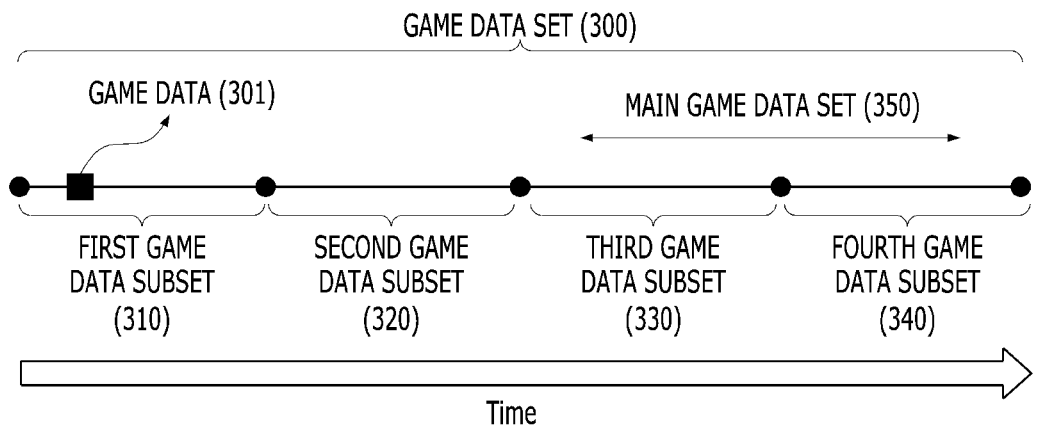
FIG. 4 is an exemplary diagram for specifically describing a game data set of a user according to an exemplary embodiment of the present disclosure.

According to an exemplary embodiment of the present disclosure, the processor 110 may identify a singularity where a change amount of the evaluation score exceeds a predetermined threshold change amount. More specifically, the processor 110 may derive the change amount of the evaluation score based on each of the evaluation scores outputted by outputting the action evaluation model for each of one or more game data subsets as the input. The processor 110 determines the optimum operation for the game data subset using the optimum operation determination submodel of the operation evaluation model and compares the optimum operation determined using the evaluation score determination submodel with the operation of the player to determine the evaluation score for the game data subset. For example, as illustrated in FIG. 4, when one or more game data subsets constituting the game data set 300 are a first game data subset 310, a second game data subset 320, a third game data subset 330, and a fourth game data subset 340, respectively and the evaluation scorers of the one or more game data subsets are 2, 6, 9, and 2, respectively, the processor 110 may derive the change amount of the evaluation score as +4, +3, and −7 through the evaluation score. In this case, when the predetermined threshold change amount is ±5, the processor 110 may determine that the threshold change amount is exceeded when the change amount of the evaluation score is −7 (i.e., a change amount derived through the evaluation score of each of the third game data subset and the fourth game data subset) to determine the third game data subset as the singularity. The concrete description of the game data subset is just an example and the present disclosure is not limited thereto.

According to an exemplary embodiment of the present disclosure, the processor 110 may extract the main game data set from the game data set. Specifically, the processor 110 may identify a plurality of game data subsets within a predetermined range based on the singularity where the change amount of the evaluation score exceeds the predetermined threshold change amount. Further, the processor 110 may generate the main game data set including the plurality of identified game data subsets. As a specific example, referring to FIG. 4, when the third game data subset 330 is determined as the singularity, the processor 110 collects the plurality of game data subsets in the predetermined range based on the third game data subset to constitute the main game data set 350.

According to an exemplary embodiment of the present disclosure, the processor 110 may generate the replay image based on the main game data set extracted from at least one of the game data sets of the plurality of users. In this case, the replay image may be generated based on one or more game data subsets constituting the main game data set.

The replay image generated through the main game data by the processor 110 may include one or more special effects so that the client may identify a game main situation with high visibility. Specifically, the processor 110 may generate one or more special effects to be included in the replay image so as to more easily recognize and identify the replay image for the main situation of the game by the client and in this case, one or more special effects may include at least one of a color reversal effect, enlargement effect, a slow effect, a highlight effect, a polygonal division effect, and a repetitive effect. As a result, the client may better determine a progress situation in the game through the replay image including one or more special effects provided by the processor 110. For example, when a character in the ultimate skill shootout range of the opponent character views only an ultimate skill using motion of the opponent character and avoids the ultimate skill of the opponent character by using a momentary movement technique before an ultimate skill effect (e.g., a visual effect of the ultimate skill of the opponent character on the game), the processor 110 may generate the series of operations as the replay image. In this case, the processor 110 may display the ultimate skill using motion of the opponent character in a close-up or slow motion so that a client identifies why the character of the player uses the momentary movement technique. The description of the special effect described above is just an example and the present disclosure is not limited thereto.

According to an exemplary embodiment of the present disclosure, the processor 110 may generate the play feedback information based on the main game data set. In this case, the play feedback information may be information that causes each of the one or more game data subsets to be processed as an input of the operation evaluation model so that a high evaluation score is calculated, which may mean information that allows the play of the user to be improved. The play feedback information may include at least one evaluation information of positive evaluation, negative evaluation, and predictive evaluation for the play of the user in the game situation and may be provided to the client terminal 10 in at least one form of a voice form and a text form. Specifically, when the game data subset for a specific situation in the game performed by the user is input into the operation evaluation model and the evaluation score to be output is low, the processor 110 may provide a description of the game data subset to output the high evaluation score in the specific situation in the game performed by the user in the voice and text forms. As a specific example, when the user places a bad hand (a hand which is not good) while performing a Go game, the operation evaluation model may output the low evaluation score for the corresponding hand. In this case, the processor 110 may determine that the evaluation score output through the operation evaluation model is low and provide to the client terminal 10 information on the optimal number of game data subsets corresponding to the low evaluation score. That is, the processor 110 may enhance the interest of the client by determining the suitability of the operations performed by the user in a plurality of situations in the game and providing the play feedback information that may improve the operations. For example, when the character which is out of the ultimate skill shootout range of the opponent character moves into the shootout range of the ultimate skill of the opponent character by using the momentary movement technique and is dead by damage by the ultimate skill, the processor 110 may generate the series of operations as the replay image. In this case, the processor 10 may generate play feedback information regarding momentary movement of the character of the player to the corresponding position. For example, the play feedback information may include a comment that the character of the player should not momentarily move to the corresponding position, a display in a comment or an image that the corresponding technique should be used at a position (a position where the player of the character may avoid a pincer attack from the characters of the other opponent team players) other than the corresponding position, or an image (e.g., an image based on game data in which the character momentarily moves to another position is generated) based on game data generated by an appropriate operation which the player should perform. The aforementioned play feedback information is just an example and the present disclosure is not limited thereto.

The processor 110 may generate the play feedback information by changing a plurality of game data included in a specific game data subset that calculates the low evaluation score among one or more game data subsets.

According to an exemplary embodiment of the present disclosure, the processor 110 may generate basic commentary information based on the main game data set. In this case, the basic commentary information as information on an additional description of the play of the user may include at least one information of information on the situation of the game, information on the operation of the user, and information on a game progress time. More specifically, the processor 110 may generate commentary information corresponding to the main game data set that includes information on a main play (a main operation leading to a win or defeat of the game) of the user. For example, the processor 110 may generate commentary related information for describing an overall situation for each of information on characters performed by a user and an opponent user in the game, information on operations of the user and the opponent user in a corresponding situation, information on a main circumstance situation, information on a game duration, and information on a remaining game time separately or mutually bonding the information. A detailed description of the basic commentary information is just an example and the present disclosure may include arbitrary information for making the game situation to be understood. Accordingly, the processor 110 may generate the basic commentary information that more specifically describes the game situation to be easily known by a plurality of clients, thereby doubling a fun factor in watching the replay image by the plurality of clients.

According to an exemplary embodiment of the present disclosure, the processor 110 may generate a global evaluation score based on the evaluation score for each of one or more game data subsets of a specific user. Specifically, the processor 110 may generate a game average score for the game data set by calculating an average of evaluation scores of one or more respective game data subsets of the specific user. Further, the processor 110 may derive an overall evaluation score through at least one of values acquired by summing, normalizing, and averaging the respective game average scores of the plurality of respective game data sets.

Specifically, the evaluation score which the processor 110 outputs through the evaluation score determination model may mean a score for an operation in a specific situation in one game (i.e., one game or one round). In addition, the game average score calculated through the average of one or more evaluation scores by the processor 110 may mean a score for the entirety of one game (i.e., one game). In addition, the global evaluation score, which the processor 110 derives from at least one of the values acquired by summing, normalizing, and averaging one or more game average scores may mean scores corresponding to all games which the specific user performs up to now. Further, the processor 110 may generate winning rate prediction information among a plurality of users by comparing the overall evaluation calculated from a plurality of users. That is, the processor 110 may convert an overall playability of the user performing the game into the global evaluation score and may generate the winning rate prediction information among the plurality of users by comparing the global evaluation scores among the plurality of users. Accordingly, the plurality of users may predict a winning rate of the game among the plurality of users through the winning prediction information generated by the processor 110 in spite of performing a direct match with each other.

According to an exemplary embodiment of the present disclosure, the memory 120 may store information on a program code executable by the processor 110, game data identification information for each user, time information of each of the game data, and information related to the replay image. For example, the memory 120 may store information on a plurality of scripts for providing the play feedback information and the basic commentary information.

According to an exemplary embodiment of the present disclosure, the server memory 120 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device may operate in connection with a web storage performing a storing function of the memory on the Internet. The description of the memory is just an example and the present disclosure is not limited thereto.

According to an exemplary embodiment of the present disclosure, the network unit 130 may transmit and receive information to and from the client terminal 10 and the game server. More specifically, the network unit 130 may include a wired/wireless Internet module for network access. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, a digital subscriber line (XDSL), fibers to the home (FTTH), power line communication (PLC), or the like may be used.

The network unit 130 may be positioned at a comparatively short distance from the user terminal including a short range communication module and transmit and receive data to and from an electronic apparatus including the short range communication module. As short-range communication technology, Bluetooth, radio frequency identification (RFID), infrared data association (IrDA), ultra wideband (UWB), ZigBee, or the like may be used.

Figure 3:
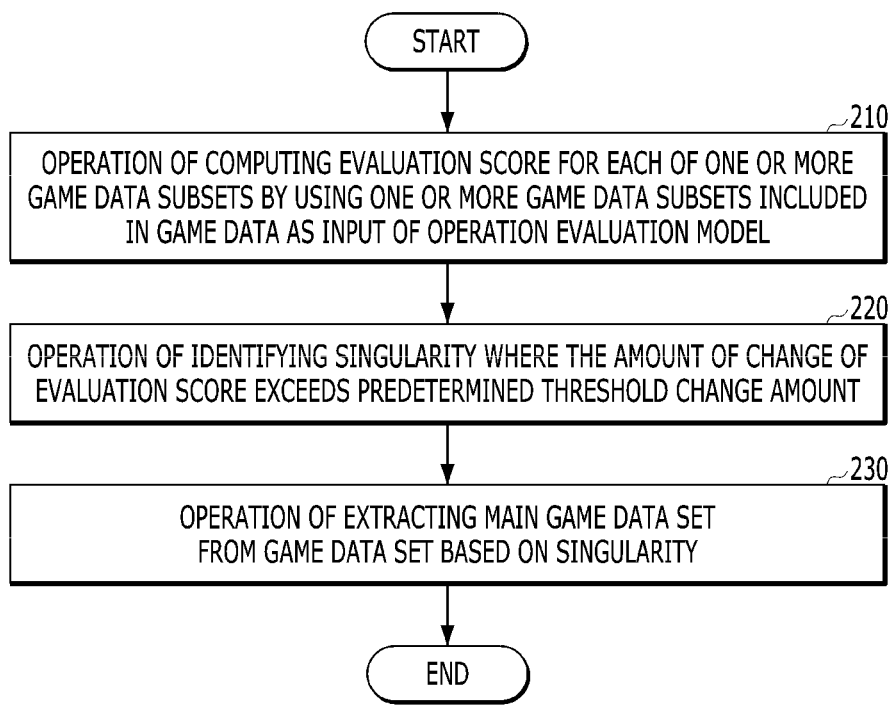
FIG. 3 is a flowchart for providing a replay image by a computing device according to an exemplary embodiment of the present disclosure.

FIG. 3 is a flowchart for providing a replay image by a computing device according to an exemplary embodiment of the present disclosure.

According to an exemplary embodiment of the present disclosure, the computing device 100 may receive the game data sets of the plurality of users from the game server. In this case, the game data set received by the computing device 100 may include one or more game data subsets. In addition, each of the one or more game data subsets may be constituted by one or more game data grouped based on a predetermined criterion. In this case, the game data may be at least one of a scripter and log data that may represent a game state change as data on a game activity of the user who played the game on the game server. For example, when the predetermined criterion corresponds to a time for 5 minutes, each of the one or more game data subsets may be constituted by one or more game data stored through the game play of the user for 5 minutes. In other words, the computing device 100 may receive one or more game data generated on the game server by performing an online game by the user. That is, the computing device 100 may acquire detailed information on the game situation played through the plurality of game data received through the game server by the user. The concrete description of the predetermined criterion for grouping the game data is just an example and the present disclosure is not limited thereto.

According to an exemplary embodiment of the present disclosure, the computing device 100 may calculate an evaluation score for each of one or more game data subsets by using one or more game data subsets included in the game data set as an input of an operation evaluation model (210). The computing device 100 may output an evaluation score for each of one or more game data subsets by using one or more game data subsets included in the game data set as an input of a behavioral evaluation model. In this case, the operation evaluation model may be constituted by an optimum operation determination submodel and an evaluation score determination submodel.

According to an exemplary embodiment of the present disclosure, the optimum operation determination submodel may be learned to determine an optimum operation (i.e., an operation that may yield a best result) among operations that the user may play in a specific situation in the game. More specifically, the optimum operation determination submodel may output the score to each of one or more candidate operations with the game data subset as an input thereof. Further, the optimum operation determination submodel may determine operation information based on the score for each of the candidate operations. Specifically, the optimal operation determination submodel may output the score to each of the plurality of operations corresponding thereto based on the game data subset and determine an operation in which the score becomes the maximum among the plurality of operations. For example, when the score for each of the plurality of operations output based on the game data subset is 15, 28, 31, 2, and 5, the optimum operation determination submodel may determine the operation by selecting 31 which is a highest score among the plurality of operations. The concrete description of a score value for the optimum operation determination submodel is just an example and the present disclosure is not limited thereto. In other words, the optimum operation determination submodel may have a plurality of operation options according to the situation of the user in the game and determine a most appropriate operation among a plurality of operation options by using a computation of the artificial neural network.

According to an exemplary embodiment of the present disclosure, the evaluation score determination submodel may calculate the evaluation score for the operation played by the user in a specific situation in the game. More specifically, the evaluation score determination submodel may output the evaluation score based on the comparison of the similarity of the optimum operation determined through the optimum operation determination submodel and the operation included in the game data subset. The evaluation score determination submodel may be learned so that the artificial neural network outputs a low evaluation score when the similarity of the optimum operation and the operation included in the game data subset is low or learned so that the artificial neural network outputs a high evaluation score when the similarity of the optimum operation and the operation included in the game data subset is high. In this case, a method for determining the similarity by the operation evaluation model may be, specifically, at least one method of a time series similarity determination method for measuring the similarity with time, a method for determining the similarity through comparison ratios of specific operations included in the game data subset, and a graph similarity measurement method for determining the similarity by converting the optimum operation into a coordinate of a graph and calculating a coordinate distance between the optimum operation converted into the coordinate of the graph and the specific operation included in the game data subset converted into the coordinate of the graph. The description of the method for determining the similarity is just an example and the present disclosure may include an arbitrary similarity measurement method that may compare and determine the similarities of the respective data.

According to an exemplary embodiment of the present disclosure, the computing device 100 may identify a singularity where a change amount of the evaluation score exceeds a predetermined threshold change amount (220). More specifically, the computing device 100 may derive the change amount of the evaluation score based on each of the evaluation scores outputted with each of one or more game data subsets as the input of the activation evaluation model. For example, as illustrated in FIG. 4, when one or more game data subsets constituting the game data set 300 are a first game data subset 310, a second game data subset 320, a third game data subset 330, and a fourth game data subset 340, respectively and the evaluation scores of the one or more game data subsets are 2, 6, 9, and 2, respectively, the computing device 100 may derive the change amount of the evaluation score as +4, +3, and −7. In this case, when the predetermined threshold change amount is ±5, the computing device 100 determines that the threshold change amount is exceeded when the change amount of the evaluation score is −7 (i.e., a change amount derived through the evaluation score of each of the third game data subset and the fourth game data subset) to determine the third game data subset as the singularity. The concrete description of the game data subset is just an example and the present disclosure is not limited thereto.

According to an exemplary embodiment of the present disclosure, the computing device 100 may extract the main game data set from the game data set based on the singularity (230). Specifically, the computing device 100 may identify a plurality of game data subsets within a predetermined range based on the singularity where the change amount of the evaluation score exceeds the predetermined threshold change amount. Further, the computing device 100 may generate the main game data set including the plurality of identified game data subsets. As a specific example, referring to FIG. 4, when the third game data subset 330 is determined as the singularity, the computing device 100 collects the plurality of game data subsets in the predetermined range based on the third game data subset to constitute the main game data set 350.

According to an exemplary embodiment of the present disclosure, the computing device 100 may generate the replay image based on the main game data set extracted from at least one of the game data sets of the plurality of users. In this case, the replay image may be generated based on one or more game data subsets constituting the main game data set.

The replay image generated by the computing device 100 may include one or more special effects so that the client may identify a main situation of the game with high visibility. Specifically, the computing device 100 may generate one or more special effects to be included in the replay image so as to more easily recognize and identify the replay image for the main situation of the game by the client and in this case, one or more special effects may include at least one of a color reversal effect, an enlargement effect, a slow effect, a highlight effect, a polygonal division effect, and a repetitive effect. As a result, the client may better determine a progress situation in the game through the replay image including one or more special effects provided by the computing device 100.

According to an exemplary embodiment of the present disclosure, the computing device 100 may generate the play feedback information based on the main game data set. In this case, the play feedback information may be information that causes each of the one or more game data subsets to be processed as an input of the operation evaluation model so that a high evaluation score is calculated, which may mean information that allows the play of the user to be improved. The play feedback information may include at least one evaluation information of positive evaluation, negative evaluation, and predictive evaluation for the play of the user in the game situation and may be provided to the client terminal 10 in at least one form of a voice form and a text form. Specifically, when the game data subset for a specific situation in the game performed by the user is input into the operation evaluation model and the evaluation score to be output is low, the computing device 100 may provide a description of the game data subset to output the high evaluation score in the specific situation in the game performed by the user in the voice and text forms. That is, the computing device 100 may enhance the interest of the client by determining the suitability of the operations performed by the user in a plurality of situations in the game and providing the play feedback information that may improve the operations.

Figure 5:
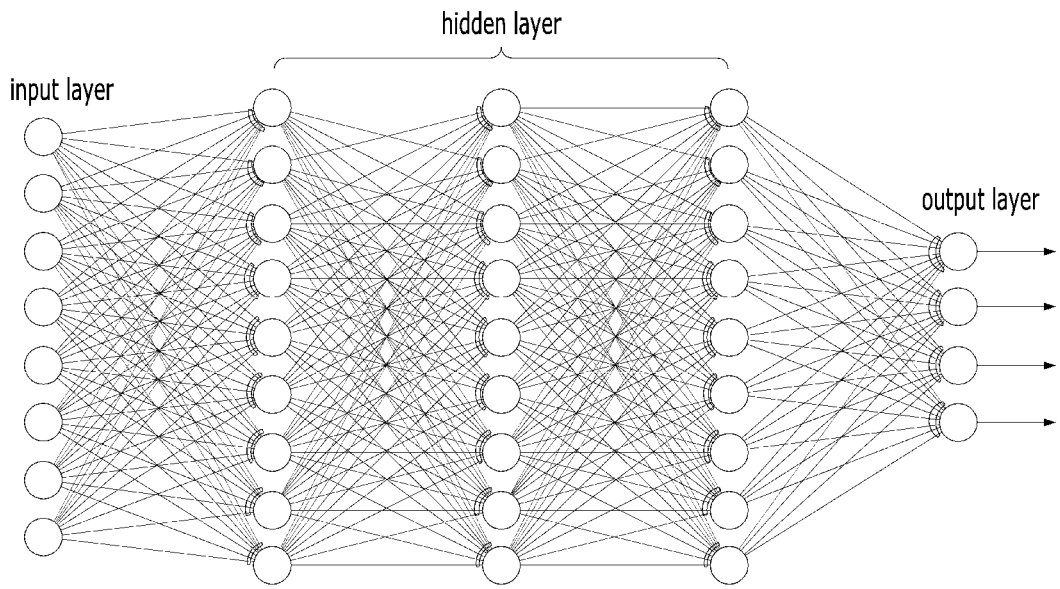
FIG. 5 is a schematic diagram illustrating an artificial neural network configuring an operation evaluation model according to an exemplary embodiment of the present disclosure.

FIG. 5 is a schematic diagram illustrating an artificial neural network configuring an operation evaluation model according to an exemplary embodiment of the present disclosure.

Throughout the present specification, a computation model, the neural network, a network function, and the neural network may be used as the same meaning. The neural network 400 may be generally constituted by an aggregate of calculation units which are mutually connected to each other, which may be called "node". The "nodes" may also be called "neurons". The neural network 400 is configured to include one or more nodes. The nodes (alternatively, neurons) constituting the neural networks 400 may be mutually connected to each other by one or more "links".

In the neural network 400, one or more nodes connected through the link may relatively form the relationship between an input node and an output node. Concepts of the input node and the output node are relative and a predetermined node which is in the output node relationship with respect to one node may have the input node relationship in the relationship with another node and vice versa. As described above, the relationship of the output node to the input node may be generated based on the link. One or more output nodes may be connected to one input node through the link and vice versa.

In the relationship of the input node and the output node connected through one link, a value of the output node may be determined based on data input in the input node. Here, a node connecting the input node and the output node to each other may have a weight. The weight is variable and the weight is variable by a user or an algorithm in order for the neural network 400 to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network 400, one or more nodes are connected to each other through one or more links to form the input node and output node relationships in the neural network 400. A characteristic of the neural network 400 may be determined according to the number of nodes, the number of links, correlations between the nodes and the links, and values of the weights granted to the respective links in the neural network 400. For example, when the same number of nodes and links exist and two neural networks 400 in which the weight values of the links are different from each other exist, it may be recognized that two neural networks 400 are different from each other.

The neural network 400 may be configured to include one or more nodes. Some of the nodes constituting the neural network 400 may constitute one layer based on distances from an initial input node. For example, an aggregation of nodes which of which distances from the initial input node are n may constitute an n layer. The distance from the initial input node may be defined by the minimum number of links required for reaching the corresponding node from the initial input node up to the corresponding node. However, definition of the layer is predetermined for description and the order of the layer in the neural network 400 may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network. In the neural network according to an exemplary embodiment of the present disclosure, the number of nodes of the input layer may be the same as the number of nodes of the output layer, and the neural network may be a neural network of a type in which the number of nodes decreases and then, increases again as the layer progresses from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases as the layer progresses from the input layer to the hidden layer. Further, in the neural network according to still another exemplary embodiment of the present disclosure, the number of nodes of the input layer may be larger than the number of nodes of the output layer, and the neural network may be a neural network of a type in which the number of nodes increases as the layer progresses from the input layer to the hidden layer. The neural network according to yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, latent structures of data may be determined. That is, potential structures of photos, text, video, voice, and music (e.g., what objects are in the picture, what the content and feelings of the text are, what the content and feelings of the voice are) may be determined. The deep neural network may include a convolutional neural network, a recurrent neural network (RNN), an auto encoder, generative adversarial networks (GAN), a restricted Boltzmann machine (RBM), a deep belief network (DBN), a Q network, a U network, a Siam network, and the like. The disclosure of the deep neural network described above is just an example and the present disclosure is not limited thereto.

In an exemplary embodiment of the present disclosure, the neural network 400 may include multilayer Perceptron (MLP), recurrent neural network (RNN), Convolutional Neural Network (CNN), and the like so as to process data. In addition, in an exemplary embodiment of the present disclosure, the neural network 400 of the present disclosure may include a long short-term memory (LSTM) so as to prevent performance degradation due to a long range dependency vanishing gradient that may occur as an event length increases. Further, in an exemplary embodiment of the present disclosure, probabilistic slope descent (SGD), momentum, Adam, AdaGrad, RMSprop, etc. may be used as an optimization technique for the method of the artificial neural network 400. In addition, when learning data may be learned only once, parameters minimizing an error function may be obtained through repeated epochs and it may be determined whether a learning step is finished after checking whether sufficient optimization is performed.

Unlike normal feedforward neural networks, in the case of RNNs, an output of a hidden layer may be an input of the same hidden layer again. The RNN is a neural network that performs a computation by simultaneously considering input data currently input and data received in the past and has a feedback structure, thereby holding a memory capability. Thus, the RNN may be trained to interpret current data according to a meaning of the previous data in the data. The LSTM which is one of the RNNs may be called a long short term memory network and learn long dependency. In an exemplary embodiment of the present disclosure, the neural network may include any neural network capable of processing data, such as depth gated RNN, clockwork RNN, etc., in addition to the LSTM which is one of the RNNs.

Figure 6:
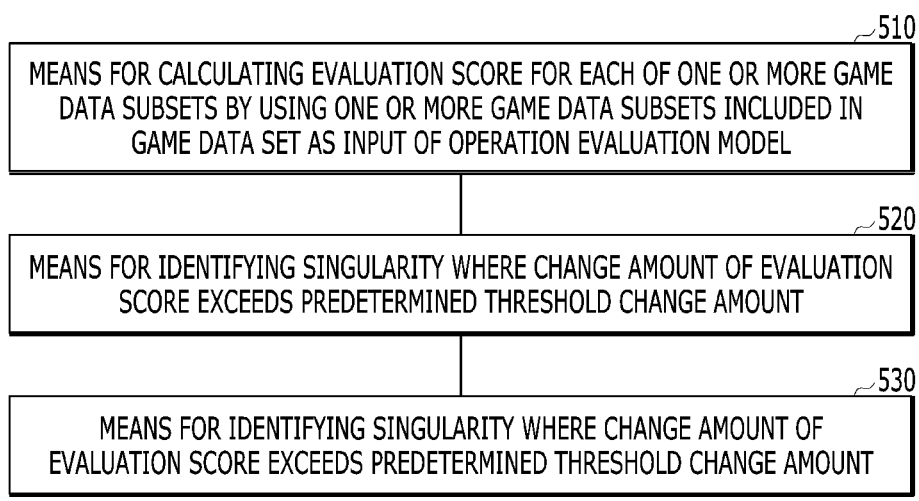
FIG. 6 is a block diagram illustrating a means for providing a replay image according to an exemplary embodiment of the present disclosure.

FIG. 6 is a block diagram illustrating a means for providing a replay image according to an exemplary embodiment of the present disclosure.

According to an exemplary embodiment of the present disclosure, the computing device 100 may include a means 510 for calculating an evaluation score for each of one or more game data subsets by using the one or more game data subsets included in a game data set as an input of an operation evaluation model, a means 520 for identifying a singularity where a change amount of the evaluation score exceeds a predetermined threshold change amount, and a means 530 for extracting a main game data set from the game data set based on the singularity, in order to provide a replay image.

Alternatively, each of the one or more game data subsets may include one or more game data grouped based on a predetermined criterion.

Alternatively, the operation evaluation model may include an optimum operation determination submodel that is learned to determine an optimum operation corresponding to the game data subset with the game data subset as an input and an evaluation score determination submodel learned to output the evaluation score based on a comparison of the similarity of the optimum operation determined through the optimum operation determination submodel and an operation included in the game data subset.

Alternatively, the means for extracting the main game data set from the game data set based on the singularity may include a means for identifying a plurality of game data subsets within a predetermined range based on the singularity among the game data sets and a means for generating a main game data set including the plurality of identified game data subsets.

Alternatively, the computing device 100 may further include a means for generating a replay image based on the main game data set and the replay image may include one or more special effects that enable a client to identify a main situation of the game.

Alternatively, the operation may further include an operation of generating play feedback information based on the main game data set and the play feedback information as information for causing a high evaluation score to be output in the evaluation score determination submodel may mean information that allows the play of the user to be improved.

Alternatively, the play feedback information may be generated by changing one or more game data included in a specific game data subset that calculates the low evaluation score among one or more game data subsets.

Alternatively, the operation may further include an operation of generating game addition information based on the main game data set and the game addition information as information on a further description related to the play of the user may include at least one of information on a game situation, information of the operation of the user, and information on a game progress time.

Alternatively, the computing device 100 may further include a means for calculating an overall evaluation score based on an evaluation score for each of one or more game data subsets for each of a plurality of users and a means for generating winning rate prediction information among the plurality of users by comparing respective overall evaluations calculated for each of the plurality of users.

Figure 7:
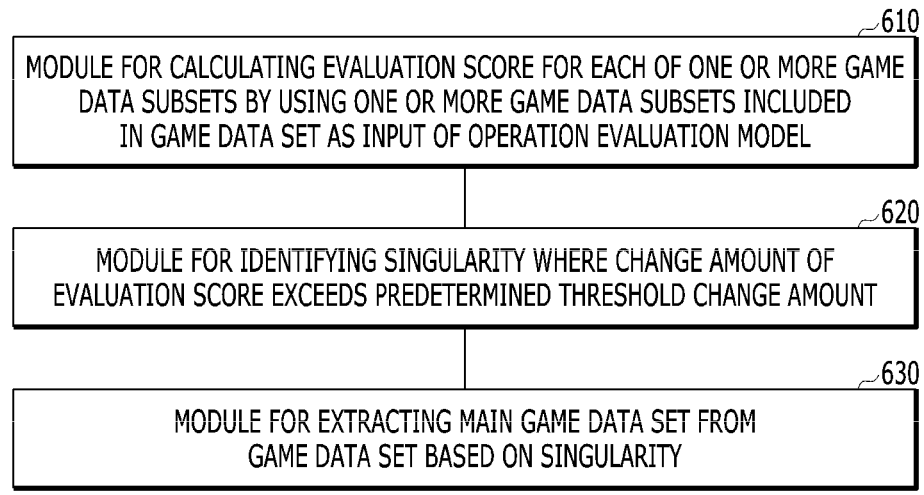
FIG. 7 is a block diagram illustrating a module for providing a replay image according to an exemplary embodiment of the present disclosure.

FIG. 7 is a block diagram illustrating a module for providing a replay image according to an exemplary embodiment of the present disclosure.

According to an exemplary embodiment of the present disclosure, the computing device 100 may include a module 610 for calculating an evaluation score for each of one or more game data subsets by using the one or more game data subsets included in a game data set as an input of an operation evaluation model, a module 620 for identifying a singularity where a change amount of the evaluation score exceeds a predetermined threshold change amount, and a module 630 for extracting a main game data set from the game data set based on the singularity, in order to provide a replay image.

Figure 8:
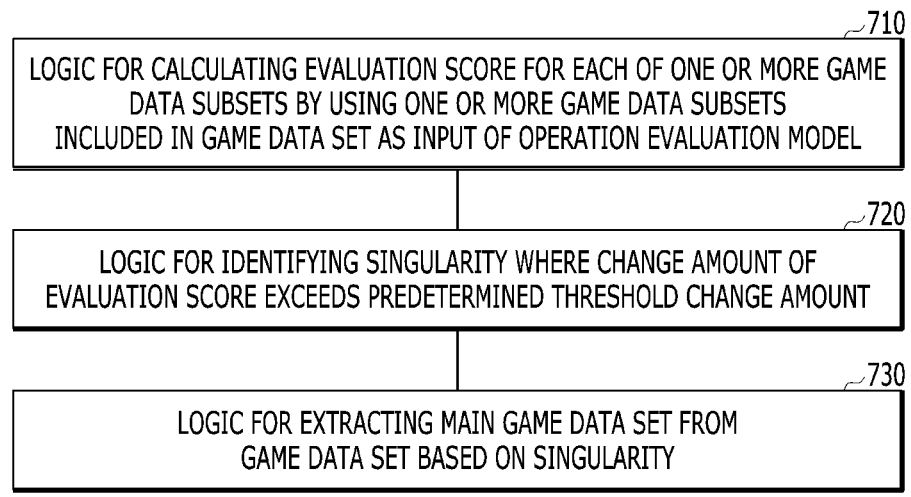
FIG. 8 is a block diagram illustrating a logic for providing a replay image according to an exemplary embodiment of the present disclosure.

FIG. 8 is a block diagram illustrating a logic for providing a replay image according to an exemplary embodiment of the present disclosure.

According to an exemplary embodiment of the present disclosure, the computing device 100 may include a logic 710 for calculating an evaluation score for each of one or more game data subsets by using the one or more game data subsets included in a game data set as an input of an operation evaluation model, a logic 720 for identifying a singularity where a change amount of the evaluation score exceeds a predetermined threshold change amount, and a logic 730 for extracting a main game data set from the game data set based on the singularity, in order to provide a replay image.

Figure 9:
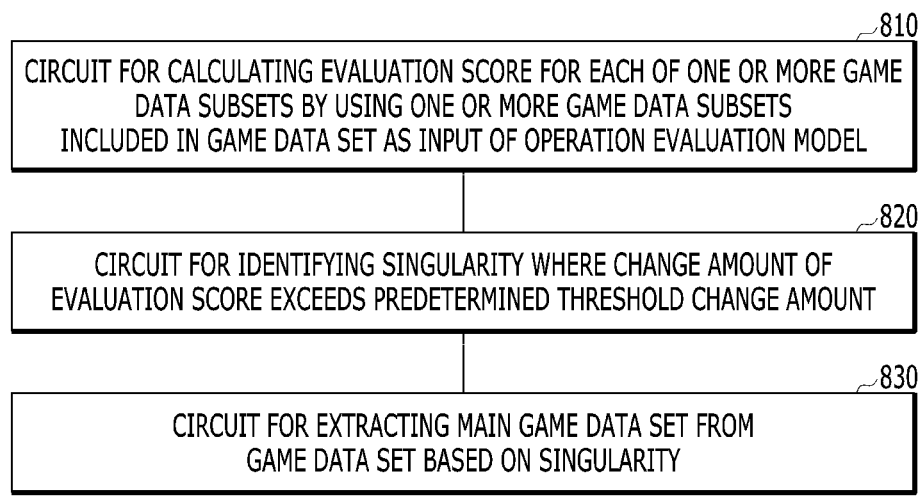
FIG. 9 is a block diagram illustrating a circuit for providing a replay image according to an exemplary embodiment of the present disclosure.

FIG. 9 is a block diagram illustrating a circuit for providing a replay image according to an exemplary embodiment of the present disclosure.

According to an exemplary embodiment of the present disclosure, the computing device 100 may include a circuit 810 for calculating an evaluation score for each of one or more game data subsets by using the one or more game data subsets included in a game data set as an input of an operation evaluation model, a circuit 820 for identifying a singularity where a change amount of the evaluation score exceeds a predetermined threshold change amount, and a circuit 830 for extracting a main game data set from the game data set based on the singularity, in order to provide a replay image.

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

Figure 10:
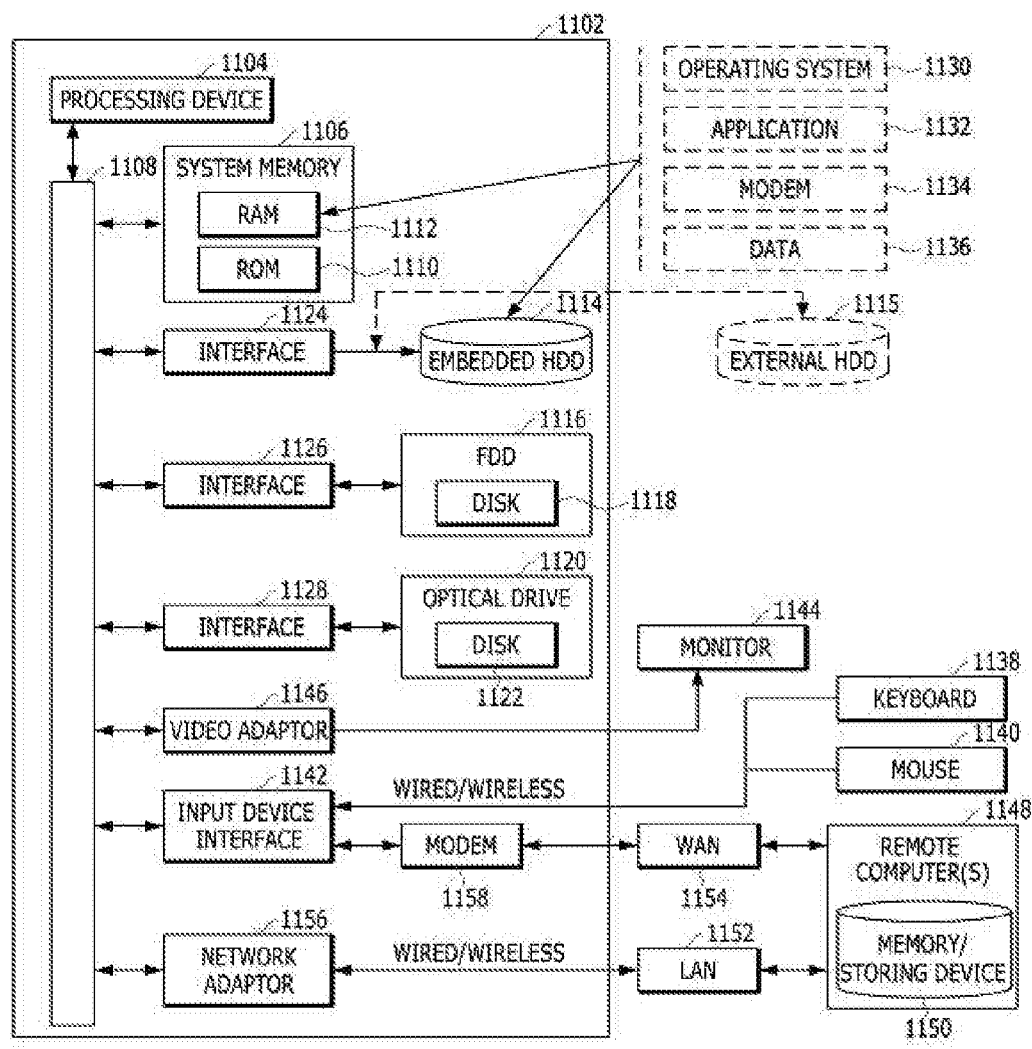
FIG. 10 is a simple and general schematic view of an exemplary computing environment in which exemplary embodiments of the present disclosure may be implemented.

FIG. 10 is a simple and general schematic view of an exemplary computing environment in which exemplary embodiments of the present disclosure may be implemented.

The present disclosure has generally been described above in association with a computer executable instruction which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable instruction, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 2110 and a random access memory (RAM) 2112. A basic input/output system (BIOS) is stored in the non-volatile memories 2110 including the ROM, the EPROM, the EEPROM, and the like and the BIOS includes a basic routine that assists in transmitting information among components in the computer 1102 at a time such as in-starting. The RAM 2112 may also include a high-speed RAM including a static RAM for caching data, and the like.

The computer 1102 also includes an internal hard disk drive (HDD) 2114 (for example, EIDE and SATA)—the internal hard disk drive (HDD) 2114 may also be configured for an external purpose in an appropriate chassis (not illustrated)—, a magnetic floppy disk drive (FDD) 2116 (for example, for reading from or writing in a mobile diskette 2118), and an optical disk drive 1120 (for example, for reading a CD-ROM disk 1122 or reading from or writing in other high-capacity optical media such as the DVD). The hard disk drive 2114, the magnetic disk drive 2116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 2130, one or more application programs 2132, other program module 2134, and program data 2136 may be stored in the drive and the RAM 2112. All or some of the operating system, the application, the module, and/or the data may also be cached by the RAM 2112. It will be well appreciated that the present disclosure may be implemented in various operating systems which are commercially usable or a combination of the operating systems.

A user may input instructions and information in the computer 1102 through one or more wired/wireless input devices, for example, pointing devices such as a keyboard 2138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such a device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

What is claimed is:

1. A non-transitory computer readable medium storing a computer program, wherein when the computer program is executed by one or more processors of a computing device, the computer program performs a method, and the method includes:
   computing an evaluation score—the evaluation score is a score for an operation played by the user in a specific situation in the game—for each of one or more game data subsets by using the one or more game data subsets included in a game data set as input of an operation evaluation model; identifying a singularity where the amount of change of the evaluation score exceeds a predetermined threshold change amount;
   identifying a plurality of game data subsets within a redetermined range of the game data set based on the singularity;
   generating a main game data set including the identified plurality of game data subsets;
   generating a replay image based on the main game data set;
   generating play feedback information based on the main game data set corresponding to the replay image;
   wherein the game data is data on a game activity of a user who played a game;
   wherein the operation evaluation model includes an optimal operation determination submodel that is trained to determine an optimum operation corresponding to the game data subset by using the game data subset as an input and an evaluation score determination submodel that is trained to output the evaluation score based on a comparison of a similarity between the optimum operation determined by the optimal operation determination submodel and an operation included in the game data subset; and
   wherein each of the one or more game data subsets includes one or more game data grouped by predetermined criteria.

2. The non-transitory computer readable medium according to claim 1,
   wherein the replay image includes one or more special effects that allow a client to identify a main situation of a game.

3. The non-transitory computer readable medium according to claim 1,
   wherein the play feedback information is information for causing a high evaluation score to be output in the evaluation score determination submodel, and means information for allowing play of a user to be improved.

4. The non-transitory computer readable medium according to claim 3, wherein the play feedback information is generated by modifying one or more game data included in a specific game data subset that computed a low evaluation score among the one or more game data subsets.

5. The non-transitory computer readable medium according to claim 1, wherein the method further includes:
   generating a game additional information based on the main game data set, and
   wherein the game additional information is information related to a further description related to a play of a user and includes at least one of information about a situation of a game, information about a movement of a user or information about a game progress time.

6. The non-transitory computer readable medium according to claim 1, wherein the method further includes:
   computing an overall evaluation score based on an evaluation score for each of one or more game data subsets for each of plurality of users; and
   generating winning rate prediction information between the plurality of users by comparing each of overall evaluation for each of the plurality of users.

7. A method for providing replay image, comprising:
   computing an evaluation score—the evaluation score is a score for an operation played by the user in a specific situation in the game—for each of one or more game data subsets by using the one or more game data subsets included in the game data as input of an operation evaluation model;
   identifying a singularity where the amount of change of the evaluation score exceeds a predetermined threshold change amount; and
   identifying a plurality of game data subsets within a redetermined range of the game data set based on the singularity;
   generating a main data set including the identified plurality of game data subsets;
   generating a replay image based on the main game data set;
   generating play feedback information based on the main game data set corresponding to the replay image;
   wherein the game data is data on a game activity of a user who played a game;
   wherein the operation evaluation model includes an optimal operation determination submodel that is trained to determine an optimum operation corresponding to the game data subset by using the game data subset as an input and an evaluation score determination submodel that is trained to output the evaluation score based on a comparison of a similarity between the optimum operation determined by the optimal operation determination submodel and an operation included in the game data subset; and
   wherein each of the one or more game data subsets includes one or more game data grouped by predetermined criteria.

8. A server for providing replay image, comprising:
   a server processor including one or more cores; a server memory storing program codes executable on the processor; and a server network unit transmitting/receiving data with a client device;

wherein the processor is configured to: compute an evaluation score—the evaluation score is a score for an operation played by the user in a specific situation in the game—for each of one or more game data subsets by using the one or more game data subsets included in the game data as input of an operation evaluation model; identify a singularity where the amount of change of the evaluation score exceeds a predetermined threshold change amount; identify a plurality of game data subsets within a predetermined range of the game data set based on the singularity: generate a main Same data set including the identified plurality of game data subsets; generate a replay image based on the main game data set; generate play feedback information based on the main game data set corresponding to the replay image;

wherein the game data is data on a game activity of a user who laved a game;

wherein the operation evaluation model includes an optimal operation determination submodel that is trained to determine an optimum operation corresponding to the game data subset by using the game data subset as an input and an evaluation score determination submodel that is trained to output the evaluation score based on a comparison of a similarity between the optimum operation determined by the optimal operation determination submodel and an operation included in the game data subset; and wherein each of the one or more game data subsets includes one or more game data grouped by predetermined criteria.

* * * * *